United States Patent
Degtiarev et al.

(10) Patent No.: US 12,211,180 B1
(45) Date of Patent: Jan. 28, 2025

(54) AI-DRIVEN PHOTO STYLIZATION WITH TEXT DESCRIPTION TUNING

(71) Applicant: Glam Labs, Inc., San Francisco, CA (US)

(72) Inventors: Roman Degtiarev, Tbilisi (GE); Tikhon Vorobev, Saint Petersburg (RU); Vadim Titov, Moscow (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 18/748,397

(22) Filed: Jun. 20, 2024

(51) Int. Cl.
*G06T 5/60* (2024.01)
*G06T 3/20* (2006.01)
*G06T 5/50* (2006.01)
*G06T 5/70* (2024.01)

(52) U.S. Cl.
CPC ............. *G06T 5/60* (2024.01); *G06T 3/20* (2013.01); *G06T 5/50* (2013.01); *G06T 5/70* (2024.01); *G06T 2207/20084* (2013.01)

(58) Field of Classification Search
CPC .... G06T 5/60; G06T 3/20; G06T 5/50; G06T 5/70; G06T 2207/20084
See application file for complete search history.

(56) References Cited

U.S. PATENT DOCUMENTS

| 11,922,550 B1* | 3/2024 | Ramesh | G06F 40/284 |
| 2024/0135611 A1* | 4/2024 | Costin | G06T 11/60 |

* cited by examiner

*Primary Examiner* — Phuoc Tran
(74) *Attorney, Agent, or Firm* — Georgiy L. Khayet (57) ABSTRACT

Systems and methods for AI-driven image stylization are provided. An example method includes receiving a first image and a text, the text including a prompt for transforming the first image, encoding the first image into an image latent and the text into a text embedding, randomly generating a first noise for a portion of the image latent, adding the first noise to the image latent to obtain a noisy image latent, providing the noisy image latent and the text embedding to a neural network to generate a second noise for the portion of the image latent, wherein the neural network is trained to denoise the noisy image latent, modifying the noisy image latent based on the second noise, repeating operations of generating the second noise and modifying the noisy image latent until the noisy image latent converges; and decoding the noisy image latent into a second image.

16 Claims, 7 Drawing Sheets

AI-DRIVEN PHOTO STYLIZATION WITH TEXT DESCRIPTION TUNING

TECHNICAL FIELD

This disclosure generally relates to image processing. More particularly, this disclosure relates to systems and methods for Artificial Intelligence (AI) driven image stylization with text description tuning.

BACKGROUND

AI-based image generation and transformation is used in many applications, such as video chats, social networks, online media, and others. One of the main problems encountered during image transformations is loss of quality and presence of unwanted artifacts in images.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for AI-driven image stylization is provided. The method may include receiving a first image and a text. The text may include at least one prompt for transforming the first image. The method may include encoding the first image into an image embedding and encoding the text into a text embedding. The method includes randomly generating a first noise and injecting the first noise into a specified portion of the image latent to obtain a noisy image latent. The noisy image latent and the text embedding are provided to a neural network trained to refine the noisy image latent by computing a second noise, specific to the portion of the image latent. The first neural network can be trained to denoise the noisy image latent towards a true data distribution for embeddings corresponding to images. The method may include modifying the noisy image latent by a linear transformation based on the second noise. The process of obtaining the second noise and modifying the noisy image latent is repeated iteratively until the noisy image latent converges to a further latent belonging to the true data distribution for embeddings corresponding to images. The method may include decoding, using a second neural network, the noisy image embedding into a second image.

The image latent can be generated by a Variational Autoencoders Encoder (VAE). The first neural network may include a U-net neural network. The prompt may include instructions for the stylization of the first image. The method may also involve extracting at least one feature of a person present in the first image by using a third neural network for object prediction and another neural network for pose estimation. The extracted features may include, but are not limited to, the ethnicity, gender, and age of the person, as well as the orientation of the person's body relative to the plane of the image. Additionally, the method includes updating the prompt text with these features before encoding it into a text embedding. The text embedding can be obtained, for example, by a Contrastive Language-Image Pretraining (CLIP) neural network model.

Prior to generating the second noise, the method may include generating, based on the first image, a control vector corresponding to one or more key points in the first image. The control vector can be provided to the first neural network during generation of the second noise.

The first noise may include a Gaussian noise. The portion of the image latent where the first noise is added corresponds to a specific part of the first image, identified using the mask.

According to another embodiment, a system for AI-driven image stylization is provided. The system may include at least one processor and a memory storing processor-executable codes, wherein the processor can be configured to implement the operations of the above-mentioned method for image transformation.

According to yet another aspect of the disclosure, there is provided a non-transitory processor-readable medium, which stores processor-readable instructions. When the processor-readable instructions are executed by a processor, they cause the processor to implement the above-mentioned method for AI-driven image stylization.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes methods and systems for AI-driven image stylization. Specifically, certain embodiments enable stylization of photographs. In some embodiments, a system receives an image and a text prompt. The text contains instructions for stylizing a particular portion of the image, which is identified by applying a mask. The system then uses one or more classifiers to extract at least one feature from the image and add it to the text prompt. This feature is associated with specific characteristics of an object, person, or animal present in the image. The system uses a latent diffusion algorithm to apply stylization only to the masked portion of the image, leaving the rest unchanged. Before applying the diffusion algorithm, the text is encoded into a text embedding (e.g., by using CLIP), and the selected portion of the image is encoded into an image latent (e.g., by using VAE). Random Gaussian noise (first noise) is added to the image latent to obtain a noisy image latent. This noisy image latent is then combined with the text embedding to form a composite embedding, which is inputted into a U-net neural network. The U-net neural network predicts a second noise, which is used to refine the noisy image latent by a linear transformation. This process is iterated multiple times for further refinement. Finally, the refined noisy image latent is decoded (e.g., using a VAE decoder) to produce a modified image according to the text prompt.

Existing solutions using the latent diffusion algorithm typically stylize entire images. However, embodiments described in this disclosure can selectively stylize portions of an image by applying different styles to specific masked regions. The system uses segmentation masks for static images to identify and isolate objects. This approach allows the system to apply varying degrees of modification to distinct areas, ensuring some regions are altered more or less than others.

Furthermore, existing solutions often generate stylized images with artifacts. These artifacts may include changes to person's ethnicity, age, gender, or misplaced facial features. These artifacts may also cause incorrect spatial orientation, like facing away from the camera instead of facing towards the camera or vice versa. Embodiments of the present disclosure mitigate these issues by allowing adaptive image styling that accounts for the presence and position of objects in the scene. The system modifies the text instructions before encoding them into CLIP by first passing them through a text tokenizer. This modification ensures that the ethnicity, gender, age, and person's pose (e.g., facing the camera or not) are accurately taken into account. To obtain this information from the image, one or more classifiers are used to determine person's ethnicity, gender, and age. A pose estimator, such as DensePose, can also be employed to predict person's position in the scene, which helps maintain spatial accuracy in the final stylized image.

Figure 1:
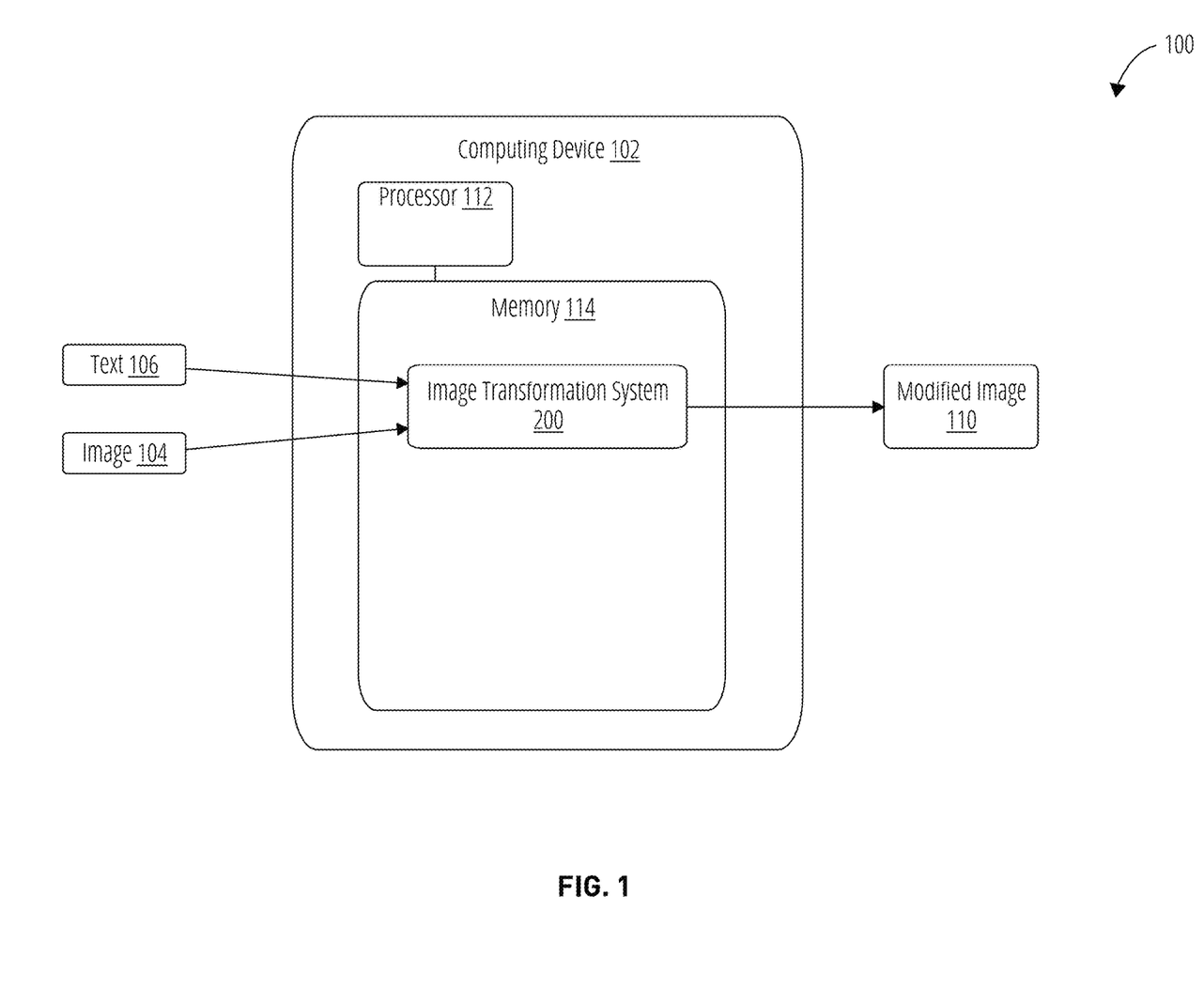
FIG. 1 shows an example environment, in which system and methods for AI-driven image stylization can be implemented, according to some example embodiments of the present disclosure.

Referring now to the drawings, FIG. 1 shows an example environment 100, in which system and methods for AI-driven image stylization can be implemented. Environment 100 may include a computing device 102 including a processor 112 and a memory 114. Memory 114 may store an image transformation system 200 as processor-executable instructions.

Computing device 102 may include, but is not limited to, a notebook computer or a desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically reallocated based on demand. The cloud-based computing resource(s) may include one or more server farms/clusters including a collection of computer servers that can be co-located with network switches and/or routers.

Image transformation system 200 can receive an image 104 and a text 106. The text 106 may include a prompt for stylizing image 104. Image transformation system 200 can generate a modified image 110 based on image 104 and text 106. In various embodiments, the prompts in text 106 may include, for example, "generate image in anime style", "add snow to the background", "do not modify the background", and so forth. Image 104 and text 106 can be provided by a user of computing device 102 via a user interface. Details of image transformation system 200 are described in FIG. 2.

Figure 2:
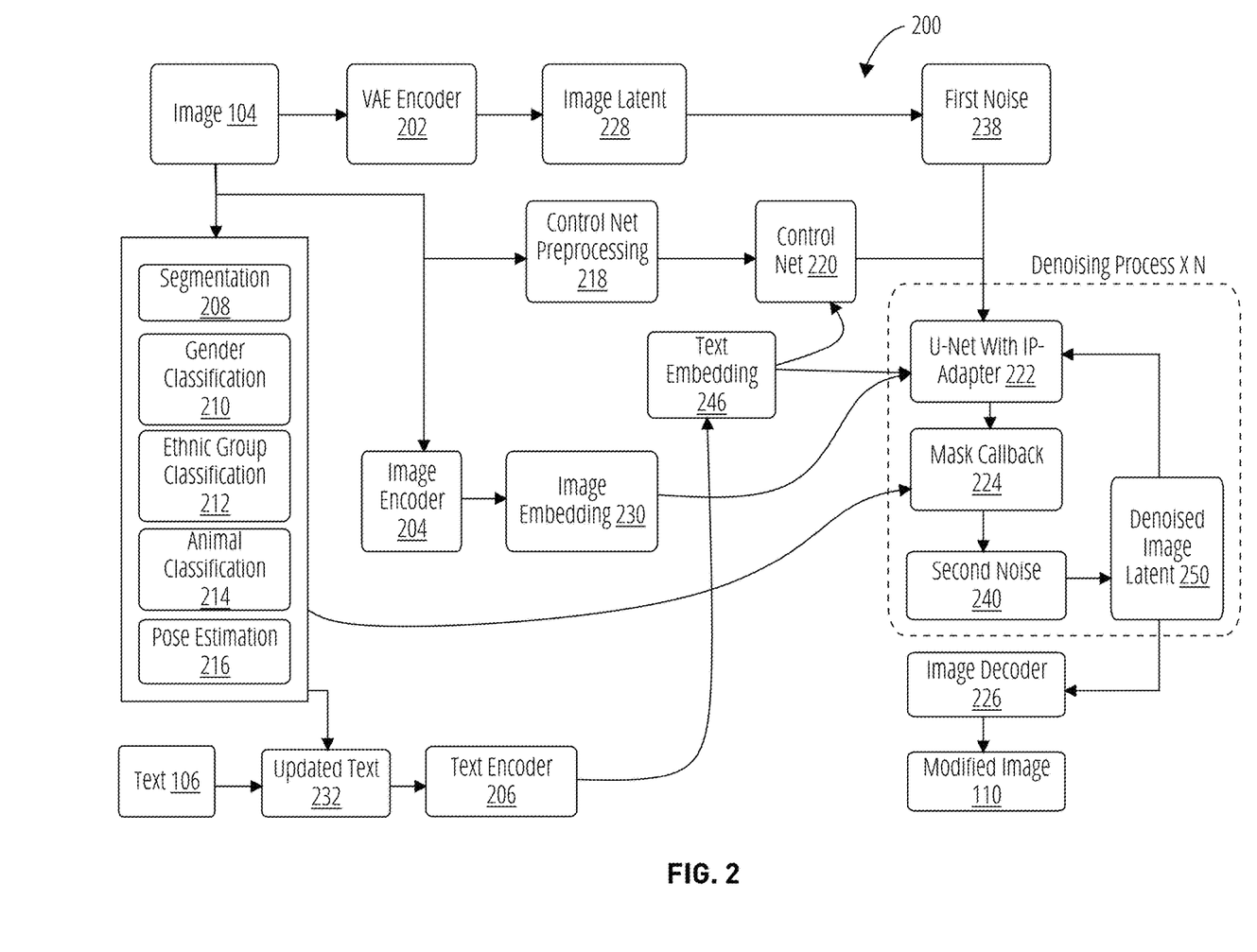
FIG. 2 is a block diagram showing modules of image transformation system, according to some example embodiments of the present disclosure.

FIG. 2 is a block diagram showing modules of image transformation system 200, according to some example embodiments. The image transformation system 200 may include a VAE encoder 202, an image encoder 204, a text encoder 206, a segmentation 208, a gender classification 210, an ethnic group classification 212, an animal classification 214, a pose estimation 216, a control net preprocessing 218, a control net 220, a U-net with IP-adapter 222, a mask callback 224, an image decoder 226. In other embodiments, image transformation system 200 may include fewer or more modules than shown in FIG. 2.

VAE encoder 202 may receive image 104 in one of computer readable formats and encode image 104 into image latent 228 (also referred to as a latent vector). Image latent 228 may refer to a numerical representation of image 104 in a vector space associated with a diffusion model.

Image encoder 204 may receive image 104 in one of computer readable formats and encode image 104 into an image embedding 230. The image embedding 230 may refer to a compressed, continuous, and typically lower-dimensional representation of image 104 in a latent space. In some embodiments, image encoder 204 can be a convolutional neural network (CNN), for example CLIP, or other types of networks designed to extract meaningful features from images.

Segmentation 208 may analyze image 104 to determine portions of image 104. The portions can be provided to mask callback 224 to generate masks for the portions. The masks may include a mask for the body of a person in image 104, a mask of background in image 104, a mask for hair region of the person in image 104, and so forth.

Gender classification 210 may analyze image 104 to determine a gender of a person present in image 104. Ethnic group classification 212 may analyze image 104 to determine an ethnic group of the person. Pose estimation 216 (such as DensePose) may predict a pose of the person in image 104, for example, whether the person is facing away or facing the camera. Image transformation system 200 may further include one or more models for detecting further features of the person present in image 104, such an age, a hairstyle, and so forth. Animal classification 214 may analyze image 104 to determine a type and/or a breed of an animal present in image 104. In various embodiments, segmentation 208, gender classification 210, ethnic group classification 212, animal classification 214, and pose estimation 216 can be implemented as pretrained neural networks.

The features determined by gender classification 210, ethnic group classification 212, animal classification 214, and pose estimation 216 can be added to text 106 to form an updated text 232. The example features added to the text 106, may include "an African young woman facing the camera", "a Caucasian man facing away from the camera", "a girl raising her right hand", and so forth. For example, if original text 106 includes "woman portrayed in an anime style" and ethnic group classification 212 determines that image 104 includes an African woman, then the text 106 can be modified to "an African woman in anime style". Updated text 232 can be provided to text encoder 206.

Text encoder 206 may transform the updated text 232 to a text embedding 246. The text embedding 246 may refer to a numerical representation of a text in a latent space. The latent space of text embedding 246 aligns with the latent space of image embedding 230 generated by the image encoder 204. The text encoder 206 can be CLIP, or other networks designed to transform the text into text embeddings.

Control net preprocessing 218 may analyze image 104 to determine an additional input for control net 220. The additional input may include sketches, outlines, edge maps, key points, and other features in the image 104. Control net 220 can generate, based on text embedding 246 and the additional input, a control vector in an internal format readable by U-net with IP-adapter 222.

Image transformation system 200 can generate a first noise 238 of the same size as the image latent 228. This first noise 238 typically consists of randomly generated Gaussian noise for a specific portion of image latent 228 that corresponds to a section of image 104. The first noise 238 can be injected into the image latent 228 to obtain noisy image latent. The noisy image latent is processed by U-net with IP-adapter 222.

U-net with IP-adapter 222 may include a U-net and an Input Processing Adapter (IP Adapter). U-net may include cross-attention layers to integrate the text embedding 246, image embedding 230 and control vector generated by control net 220. U-net is trained to predict second noise 240. This second noise 240 represents the difference between the noisy image latent and the denoised approximation that aligns with the true data distribution of image latents. This true data distribution approximates the probability distribution of clean image latents derived from a set of sample images. IP Adapter (Input Processing Adapter) can be an additional module or component that modifies how the input data is processed before being fed to the U-net. Combining a U-Net with an IP Adapter allows incorporating additional inputs and control mechanisms to enhance the image processing capabilities of the U-Net. The IP-Adapter can process the image embedding 230 to extract useful information or modify the image embedding 230 to ensure that the U-Net generates correct output.

Mask callback 224 can generate a mask determining how different parts of image 104 are processed. Specifically, mask callback 224 creates a mask that defines to what extent to process and change different parts of image 104 (for example, faces, facial features, foreground, and background). Accordingly, in some embodiments, image transformation system 200 can generate different first noise 238 (and correspondently, second noise 240) for various portions of image 104, allowing specific regions to be modified differently. This targeted approach ensures that some areas of image 104 are altered less or more than others, enabling the application of different styles to specific sections based, for example, on the prompts provided in text 106. The first noise 238 can be injected only into the part of image latent 228 that corresponds to a region of image 104 defined by the mask.

The image transformation system 200 may utilize second noise 240 to obtain a denoised image latent 250 by applying a linear transformation to the noisy image latent. The denoised image latent 250 can then be processed by U-net with IP-adapter 222 to update second noise 240, which in turn can be used to update the denoised image latent 250. This iterative process of predicting second noise 240 and updating denoised image latent 250 can be repeated several times (e.g., five) until the denoised image latent 250 converges to an image latent belonging to the true data distribution of embedding corresponding to images. Thus, the iterative process progressively aligns the denoised image latent 250 with the desired data distribution and achieve high-quality stylization.

After the iterative denoising steps, the denoised image latent 250 is provided to image decoder 226. The image decoder 226, which may include a VAE decoder, processes the refined denoised image latent 250 to reconstruct a modified image 110 that aligns with the stylistic instructions while preserving the key features of the original image.

Figure 3:
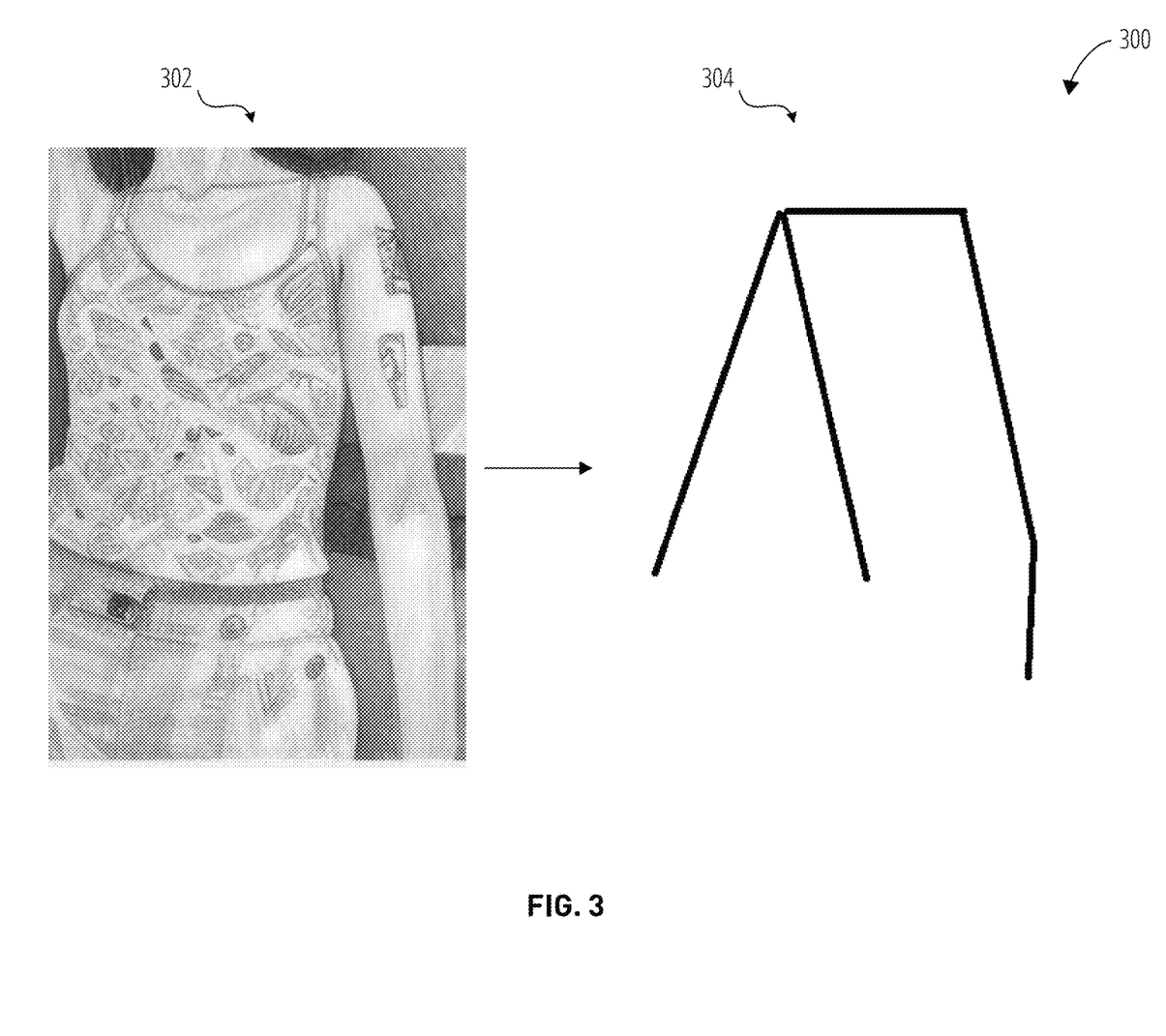
FIG. 3 is a schematic showing an example image and a corresponding skeleton, according to an example embodiment of the present disclosure.

FIG. 3 is a schematic 300 showing an example image 302 and corresponding skeleton 304. Pose estimation 216 (shown in FIG. 2) may include a neural network that generates skeleton 304 from image 302. Points in skeleton 304 can be assigned colors indicating a coordinate of the points in a horizontal direction from the point of view of the camera. In some embodiments, the skeleton 304 can be generated by a DensePose.

Pose estimation 216 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text 106 includes "woman in anime style", then the text 106 can be modified to "woman in anime style in front".

Figure 4:
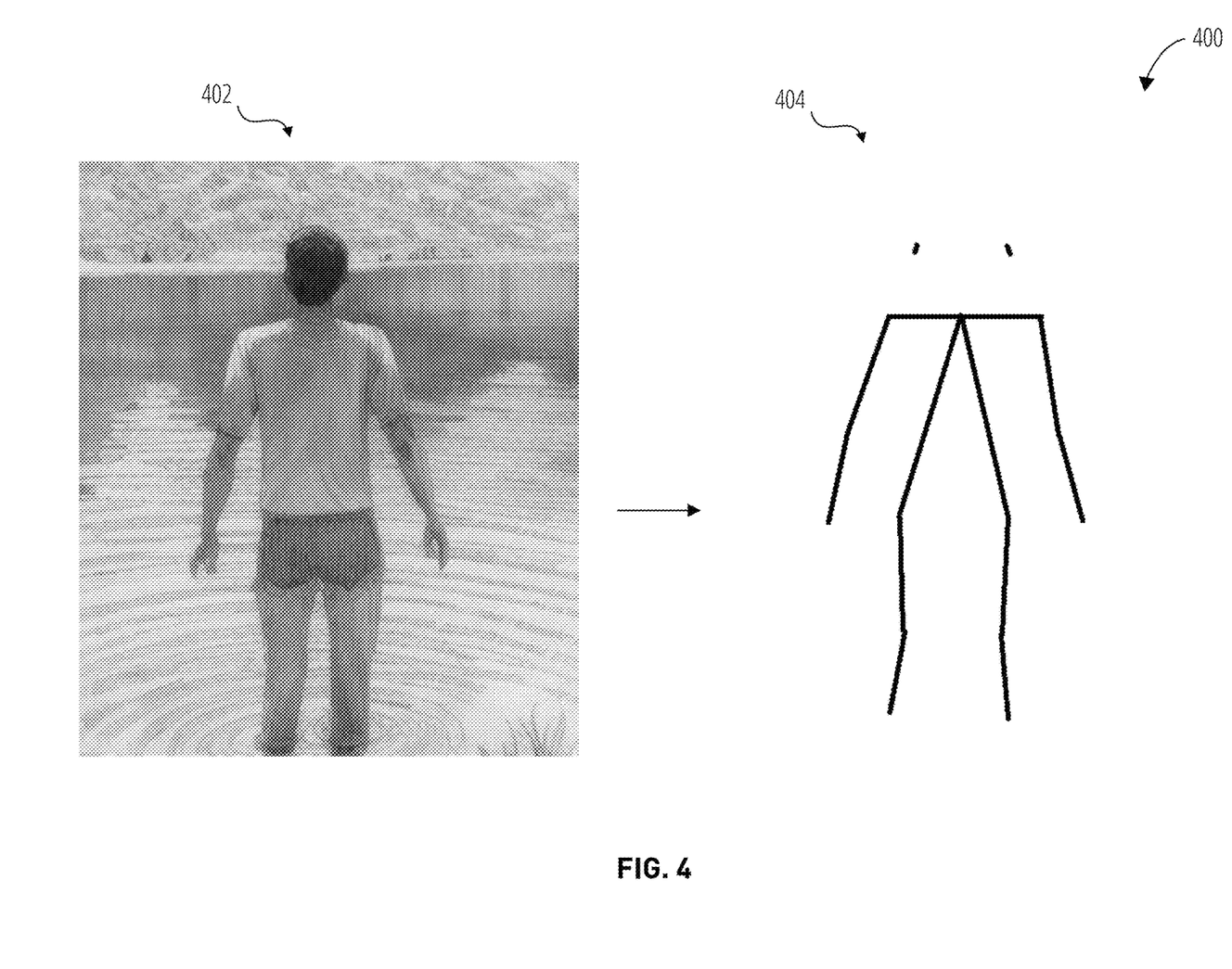
FIG. 4 is a schematic showing an example image and a corresponding skeleton, according to an example embodiment of the present disclosure.

FIG. 4 is a schematic 400 showing an example image 402 and corresponding skeleton 404. In image 402, a person is shown in full length. In corresponding skeleton 404, the left shoulder and the right shoulder have the same coordinate in the horizontal direction from the point of view of the camera. However, the coordinate of the right hip is smaller than the coordinate of the left hip. It means that the person is facing backwards. Accordingly, if original text 106 includes "a man in anime style", then the text 106 can be modified to "body of a man in anime style viewed from behind".

Figure 5:
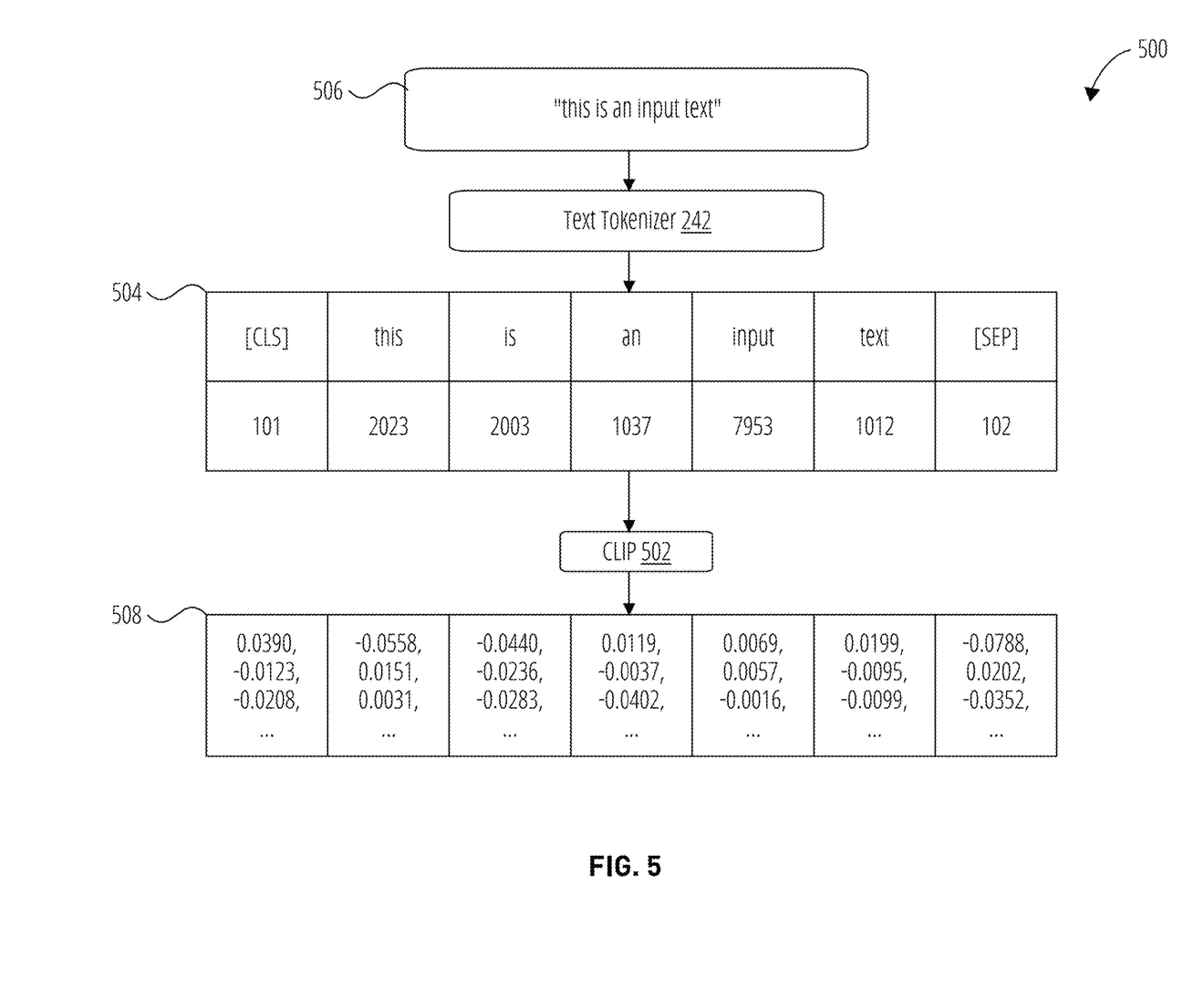
FIG. 5 is a block diagram showing details of a text encoder, according to an example embodiment of the present disclosure.

FIG. 5 is a block diagram 500 showing details of converting text into text embedding (shown in FIG. 2), according to an example embodiment. In the example of FIG. 5, CLIP 502 is used as text encoder 206 shown in FIG. 2. Text tokenizer 242 may generate text tokens 504 from raw text 506, for example, text 106. Then text tokens 504 can be provided to CLIP 502 to generate text embeddings 508.

Figure 6:
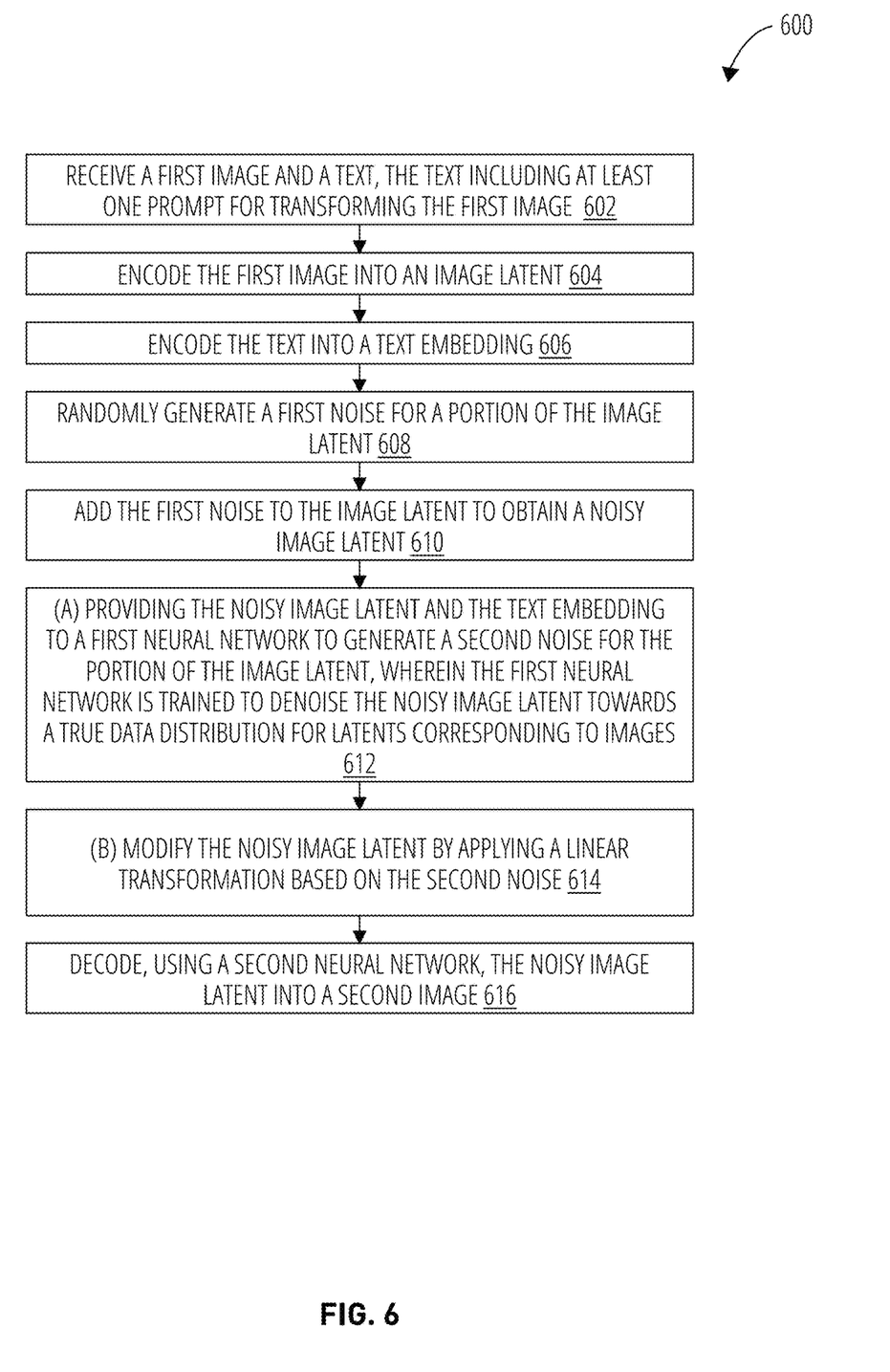
FIG. 6 is a flow chart showing a method for AI-driven image stylization, according to some example embodiments.

FIG. 6 is a flow chart showing method 600 for AI-driven image stylization, according to some example embodiments. In some embodiments, the operations of method 600 may be combined, performed in parallel, or performed in a different order. Method 600 may also include additional or fewer operations than those illustrated. Method 600 may be performed by processing logic that comprises hardware (e.g., decision making logic, dedicated logic, programmable logic, and microcode), software (such as software run on a general-purpose computer system or a dedicated machine), or a combination of both.

In block 602, method 600 may include receiving a first image and a text. The text includes at least one prompt for transforming the first image. In block 604, method 600 may include encoding the first image into an image latent. The image latent can be generated by a VAE encoder.

In block 606, method 600 may include encoding the text into a text embedding. Prior to encoding the text, method 600 may include extracting, from the first image, using a third neural network, at least one feature of a person present in the first image and adding the at least one feature to the text. The feature may include one or more of the following: ethnicity of the person, a gender of the person, an age of the person, and an orientation of body of the person with respect to a plane of the first image. The text embedding can be obtained by a CLIP neural network model.

In block 608, method 600 may include randomly generating a first noise for a portion of the image latent. This portion corresponds to a region of the first image, defined by applying a mask. The first noise is typically Gaussian and serves as an initial noise pattern for the denoising process.

In block 610, method 600 may include adding the first noise to the image latent to obtain a noisy image latent. In block 612, method 600 may include providing the noisy image latent and the text embedding a first neural network to generate a second noise for the portion of the image latent. The first neural network can be trained to denoise the noisy image latent towards a true data distribution for latents corresponding to images. Prior to generating the second noise, method 600 may include generating, based on the first image, a control vector corresponding to one or more key points in the first image. The control vector can be provided to the first neural network during generation of the second noise.

In block 614, method 600 can include modifying the noisy image latent using a linear transformation based on the second noise. The denoising operations outlined in blocks 612 and 614 can be repeated a predetermined number of times for progressive refinement until the noisy image latent converges to a further latent belonging to the true data distribution for latents corresponding to images. In block 616, method 600 may include decoding, using a second neural network, the noisy image latent into a second image.

Figure 7:
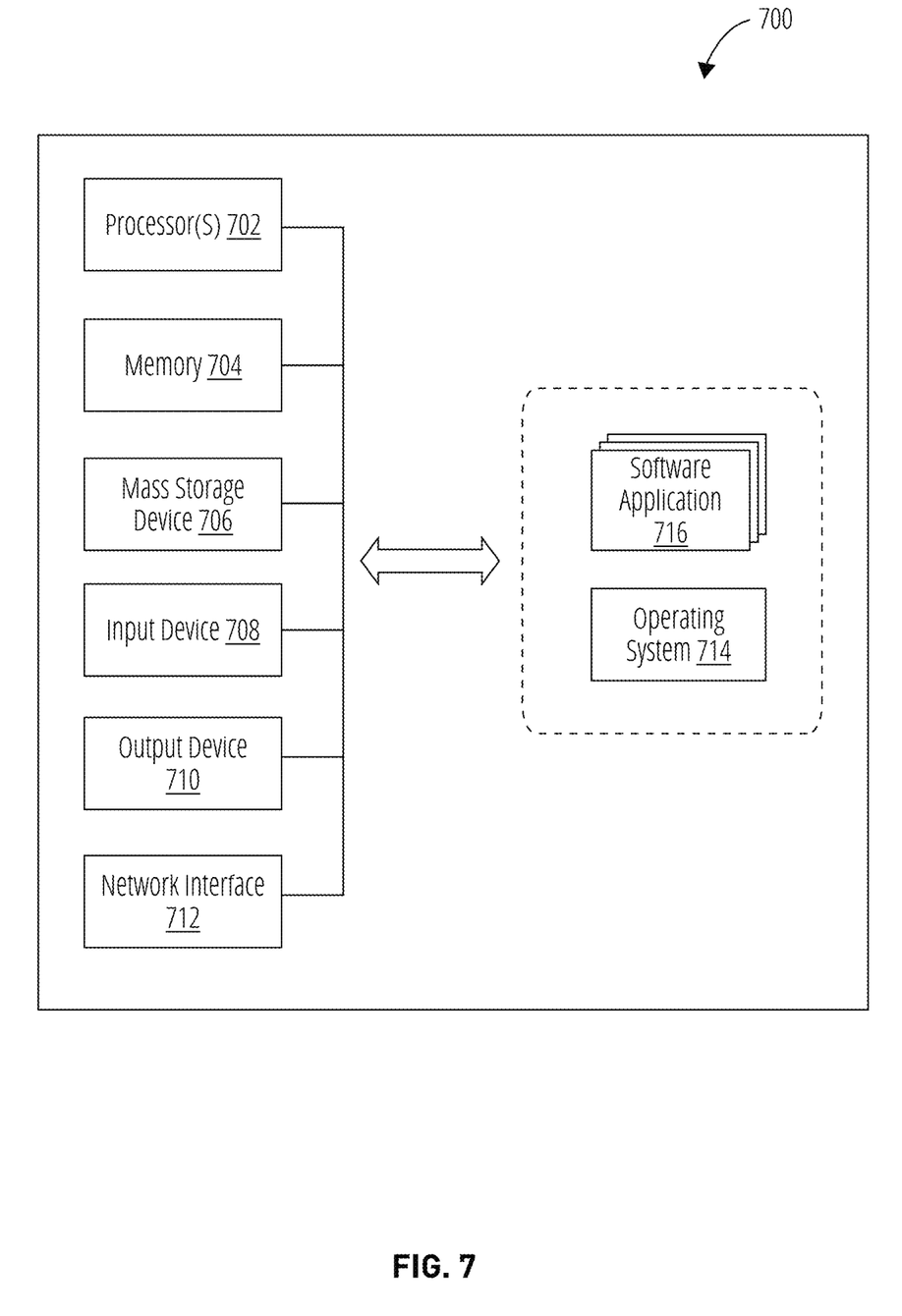
FIG. 7 is a high-level block diagram illustrating an example computer system, within which a set of instructions for causing the machine to perform any one or more of the methodologies discussed herein can be executed.

FIG. 7 is a high-level block diagram illustrating an example computer system 700, within which a set of instructions for causing the machine to perform any one or more of the methodologies discussed herein can be executed. The computer system 700 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 700 is an example of computing device 102 shown in FIG. 1. Notably, FIG. 7 illustrates just one example of the computer system 700 and, in some embodiments, the computer system 700 may have fewer elements/modules than shown in FIG. 7 or more elements/modules than shown in FIG. 7.

The computer system 700 may include one or more processor(s) 702, a memory 704, one or more mass storage devices 706, one or more input devices 708, one or more output devices 710, and a network interface 712. The processor(s) 702 are, in some examples, configured to implement functionality and/or process instructions for execution within the computer system 700. For example, the processor(s) 702 may process instructions stored in the memory 704 and/or instructions stored on the mass storage devices 706. Such instructions may include components of an operating system 714 or software applications 716. The computer system 700 may also include one or more additional components not shown in FIG. 7, such as a body, a power supply, a power supply, a global positioning system (GPS) receiver, and so forth.

The memory 704, according to one example, is configured to store information within the computer system 700 during operation. The memory 704, in some example embodiments, may refer to a non-transitory computer-readable storage medium or a computer-readable storage device. In some examples, the memory 704 is a temporary memory, meaning that a primary purpose of the memory 704 may not be long-term storage. The memory 704 may also refer to a volatile memory, meaning that the memory 704 does not maintain stored contents when the memory 704 is not receiving power. Examples of volatile memories include random access memories (RAM), dynamic random access memories (DRAM), static random access memories (SRAM), and other forms of volatile memories known in the art. In some examples, the memory 704 is used to store program instructions for execution by the processor(s) 702. The memory 704, in one example, is used by software (e.g., the operating system 714 or the software applications 716). Generally, the software applications 716 refer to software Applications suitable for implementing at least some operations of the methods for AI-driven image stylization as described herein.

The mass storage devices 706 may include one or more transitory or non-transitory computer-readable storage media and/or computer-readable storage devices. In some embodiments, the mass storage devices 706 may be configured to store greater amounts of information than the memory 704. The mass storage devices 706 may further be configured for long-term storage of information. In some examples, the mass storage devices 706 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 708, in some examples, may be configured to receive input from a user through tactile, audio, video, or biometric channels. Examples of the input devices 708 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 700, or components thereof.

The output devices 710, in some examples, may be configured to provide output to a user through visual or auditory channels. The output devices 710 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 710 may also include a touchscreen, a presence-sensitive display, or other input/output capable displays known in the art.

The network interface 712 of the computer system 700, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 712 may be a network interface card, such as an Ethernet card, an optical transceiver, a radio frequency transceiver, or any other type of device that can send and receive information.

The operating system 714 may control one or more functionalities of the computer system 700 and/or components thereof. For example, the operating system 714 may interact with the software applications 716 and may facilitate one or more interactions between the software applications 716 and components of the computer system 700. As shown in FIG. 7, the operating system 714 may interact with or be otherwise coupled to the software applications 716 and components thereof. In some embodiments, the software applications 716 may be included in the operating system 714. In these and other examples, virtual modules, firmware, or software may be part of the software applications 716.

Thus, systems and methods for AI-driven image stylization have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
   receiving a first image and a text, the text including at least one prompt for transforming the first image;
   extracting, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
   adding the at least one feature to the text to obtain an updated text;
   encoding the first image into an image latent;
   encoding the updated text into a text embedding;
   randomly generating a first noise for a portion of the image latent;
   adding the first noise to the image latent to obtain a noisy image latent;
   (a) providing the noisy image latent and the text embedding to a first neural network to generate a second noise for the portion of the image latent, wherein the first neural network is trained to denoise the noisy image latent towards a true data distribution for latents corresponding to images;
   (b) modifying the noisy image latent by applying a linear transformation based on the second noise; and
   decoding, using a second neural network, the noisy image latent into a second image.

2. The method of claim 1, wherein operations (a) and (b) are repeated a predetermined number of times until the noisy image latent converges to a further latent belonging to the true data distribution for latents corresponding to images.

3. The method of claim 1, wherein the portion of the image latent corresponds to a part of the first image, the part being obtained by applying a mask to the first image.

4. The method of claim 1, wherein the first noise includes a Gaussian noise.

5. The method of claim 1, wherein the first neural network includes a U-net neural network.

6. The method of claim 1, further comprising:
   generating, based on the first image, a control vector corresponding to one or more key points in the first image; and
   providing the control vector to the first neural network during generating the second noise.

7. The method of claim 1, wherein the image latent is generated by a Variational Autoencoders Encoder (VAE).

8. The method of claim 1, wherein the text embedding is encoded by a Contrastive Language-Image Pretraining neural network model.

9. A computing device comprising:
   a processor; and
   a memory storing instructions that, when executed by the processor, configure the computing device to:
      receive a first image and a text, the text including at least one prompt for transforming the first image;
      encode the first image into an image latent;
      extracting, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
      adding the at least one feature to the text to obtain an updated text;
      encode the updated text into a text embedding;
      randomly generate a first noise for a portion of the image latent;
      add the first noise to the image latent to obtain a noisy image latent;
      (a) provide the noisy image latent and the text embedding to a first neural network to generate a second noise for the portion of the image latent, wherein the first neural network is trained to denoise the noisy image latent towards a true data distribution for latents corresponding to images;
      (b) modify the noisy image latent by applying a linear transformation based on the second noise; and
      decode, using a second neural network, the noisy image latent into a second image.

10. The computing device of claim 9, wherein operations (a) and (b) are repeated a predetermined number of times until the noisy image latent converges to a further latent belonging to the true data distribution for latents corresponding to images.

11. The computing device of claim 9, wherein the portion of the image latent corresponds to a part of the first image, the part being obtained by applying a mask to the first image.

12. The computing device of claim 9, wherein the first noise includes a Gaussian noise.

13. The computing device of claim 9, wherein the first neural network includes a U-net neural network.

14. The computing device of claim 9, wherein the instructions further configure the computing device to:
generate, based on the first image, a control vector corresponding to one or more key points in the first image; and
provide the control vector to the first neural network during generating the second noise.

15. The computing device of claim 9, wherein the image latent is generated by a Variational Autoencoders Encoder (VAE).

16. A non-transitory computer-readable storage medium, the computer-readable storage medium including instructions that when executed by a computing device, cause the computing device to:
receive a first image and a text, the text including at least one prompt for transforming the first image;
extract, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
add the at least one feature to the text to obtain an updated text;
encode the first image into an image latent;
encode the updated text into a text embedding;
randomly generate a first noise for a portion of the image latent;
add the first noise to the image latent to obtain a noisy image latent;
(a) providing the noisy image latent and the text embedding to a first neural network to generate a second noise for the portion of the image latent, wherein the first neural network is trained to denoise the noisy image latent towards a true data distribution for latents corresponding to images;
(b) modifying the noisy image latent by applying a linear transformation based on the second noise; and
decode, using a second neural network, the noisy image latent into a second image.

* * * * *